(12) United States Patent
Arad et al.

(10) Patent No.: US 7,889,728 B2
(45) Date of Patent: Feb. 15, 2011

(54) SYSTEM AND METHOD OF MODIFYING DATA PACKET TAGS

(75) Inventors: Carmi Arad, Noflt (IL); David Melman, Bilkat Beit Hakerem (IL); Nafea Bishara, San Jose, CA (US)

(73) Assignees: Marvell Israel (MISL) Ltd., Yokneam (IL); Marvell International Ltd., Hamilton (BM)

( * ) Notice: Subject to any disclaimer, the term of this patent is extended or adjusted under 35 U.S.C. 154(b) by 324 days.

(21) Appl. No.: 12/056,181

(22) Filed: Mar. 26, 2008

(65) Prior Publication Data

US 2008/0240113 A1 Oct. 2, 2008

Related U.S. Application Data

(60) Provisional application No. 60/897,000, filed on Mar. 26, 2007, provisional application No. 60/915,476, filed on May 2, 2007.

(51) Int. Cl.
*H04L 12/28* (2006.01)
*H04L 12/56* (2006.01)

(52) U.S. Cl. ............................ 370/389; 370/401
(58) Field of Classification Search .............. None
See application file for complete search history.

(56) References Cited

U.S. PATENT DOCUMENTS

| 7,272,137 | B2* | 9/2007 | Unitt et al. | 370/389 |
| 2003/0081442 | A1* | 5/2003 | Tsuda et al. | 365/49 |
| 2003/0174719 | A1* | 9/2003 | Sampath et al. | 370/402 |
| 2004/0066781 | A1* | 4/2004 | Shankar et al. | 370/389 |

* cited by examiner

*Primary Examiner*—Chirag G Shah
*Assistant Examiner*—Minh-Trang Nguyen

(57) ABSTRACT

A system and method of managing data packets for transmission in a virtual network are disclosed. In some implementations, a network switch may generally comprise a packet modifier that modifies a VLAN tag state of a packet to be egressed as a function of an egress interface and a VLAN-ID assignment. The modified VLAN tag state may include one or more VLAN tags that are in a different order, or that have a different content, in comparison to the VLAN tags of the packet at the time of ingress.

32 Claims, 4 Drawing Sheets

SYSTEM AND METHOD OF MODIFYING DATA PACKET TAGS

CROSS-REFERENCE TO RELATED APPLICATIONS

The present application claims the benefit of the following co-pending U.S. provisional application Ser. No. 60/897,000, filed Mar. 26, 2007, entitled "CH3+QinQ Manipulation;" and Ser. No. 60/915,476, filed May 2, 2007, entitled "Handling of Double VLAN Tags in Ethernet Switches." The disclosures of the foregoing applications are incorporated herein by reference in their entireties.

BACKGROUND

1. Field of the Invention

Aspects of the present invention relate generally to data communications, and more particularly to a system and method of managing data packets for transmission in a virtual network.

2. Description of Related Art

Various types of virtual networking technologies are generally known. One popular communications standard for use in connection with virtual network implementations is the Institute of Electrical and Electronics Engineers (IEEE) 802.1Q standard for Ethernet applications. In accordance with certain features of this standard, a service provider may preserve a customer's virtual local area network (VLAN) protocols, groupings, privileges, and other VLAN parameters across the service provider's network backbone. In that regard, one or more ports dedicated to a customer may map customer communications across the provider's VLAN, relieving the customer from having to assign service provider VLAN identifications to network traffic. Accordingly, multiple customer VLAN data communications may be supported by a single service provider network; this networking strategy is generally referred to as 802.1Q tunneling or 802.1QinQ.

It is noted that data packets transmitted using QinQ (or other types of networking protocols) are VLAN tagged. During transmission from one network node to another, a data or control packet is generally received at a switch port, which subsequently forwards the packet in accordance with a tag state, i.e., in accordance with information contained in one or more tags associated with the packet. Current network protocols are deficient to the extent that they do not contemplate flexible and sophisticated manipulation of packet tags within a network switching fabric. For example, although adding or removing multiple tags and swapping or otherwise altering the positions of tags within a packet header may potentially have utility in various applications, these operations are not collectively supported in conventional inter-network communications strategies.

Therefore, it may be desirable in some instances to provide a system and method that enable identification of various kinds of tags as well as flexible and configurable manipulation of these tags supporting transmission of data packets across diverse networks.

SUMMARY

Embodiments of the present invention overcome the above-mentioned and various other shortcomings of conventional technology, providing a system and method of managing data packets for transmission in a virtual network. In some implementations, a network switch may generally comprise a packet modifier that modifies a VLAN tag state of a packet to be egressed as a function of an egress interface and a VLAN-ID assignment. The modified VLAN tag state may include one or more VLAN tags that are in a different order, or that have a different content, in comparison to the VLAN tags of the packet at the time of ingress.

The foregoing and other aspects of various embodiments of the present invention will be apparent through examination of the following detailed description thereof in conjunction with the accompanying drawing figures.

BRIEF DESCRIPTION OF THE DRAWING FIGURES

DETAILED DESCRIPTION

Introduction

Embodiments of the present invention may have utility in the field of network switches such as, for example, Ethernet switches that handle double virtual local area network (VLAN) tags (i.e., QinQ). As noted above, a switch may be a boundary (or edge) device disposed between two types of networks in some applications. For example, a switch may bridge a service provider backbone network (e.g., that forwards traffic based on traffic service) and an access network (e.g., that forwards traffic based on user identification).

While the following description addresses a situation in which a customer network is in network communication with a service provider's (generally wider area) network, the present disclosure is not intended to be limited in that regard. In particular, the system and method described herein may have utility in any application in which a packet is transmitted from a first network domain to a second network domain that is different from the first network domain, e.g., between two networks recognizing different tags, different packet formats, or both. In addition to the situation in which a customer and a service provider each maintain independent network domains, for example, a corporation or educational institution may provide independent virtual or logical networks (i.e., subnetworks) for various groups or departments within a company or university; this may be true even where the company or university employs a single physical network (i.e., an enterprise network). In this situation, a unique VLAN may be assigned to each independent department; edge switches on the enterprise network may then be configured to insert an appropriate VLAN tag into all data frames or packets ingressing the enterprise network from equipment determined to be associated with a given department subnetwork. After a packet is switched through the enterprise network, the enterprise network VLAN tag may be stripped before the packet is transmitted back to the department equipment. It is noted that the system and method of packet manipulation set forth herein are not limited to any particular network architecture or topography.

Implementation

One network arrangement such as described above is illustrated in FIG. 1; specifically, FIG. 1 is a simplified illustration depicting one embodiment of a network environment in which a tag state of packet may be manipulated.

Figure 1:
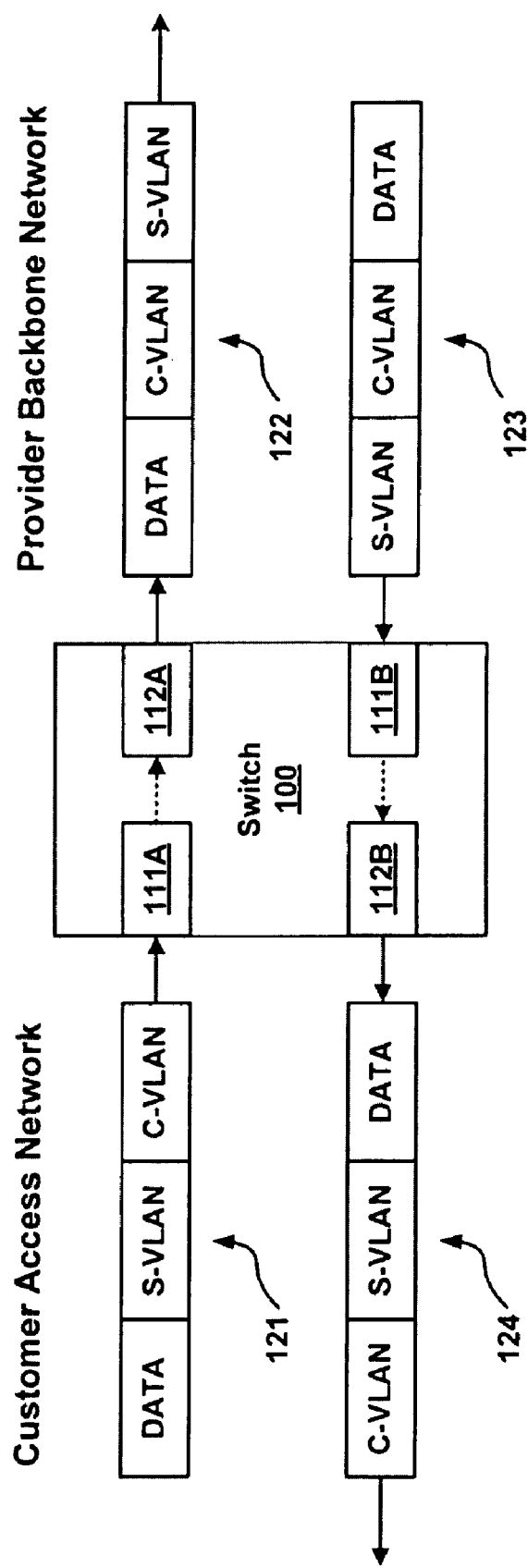
FIG. 1 is a simplified illustration depicting one embodiment of a network environment in which a tag state of packet may be manipulated.

In the embodiment shown in FIG. 1 and in other network infrastructure arrangements, a packet may generally be represented using two VLAN tags: a first VLAN tag that identifies the ServiceType network (S-VLAN); and a second VLAN tag that identifies the customer network (C-VLAN). In some embodiments, packets may have only one VLAN tag, or they may not include a VLAN tag. In the service provider backbone network, packet forwarding may be based upon the media access controller (MAC) address associated with the packet and the S-VLAN tag, whereas packet forwarding in the access network may be based upon the MAC address and the C-VLAN tag. Accordingly, to enable communications across both networks, the device (switch) bridging the service provider backbone network and the access network may generally be required to manipulate the packet in such a way that packets transmitted to the service provider backbone network have S-VLAN as the outer VLAN tag, while packets transmitted to the access network have C-VLAN as the outer VLAN tag.

A VLAN tag may generally include a Tag Protocol Identifier (TPID), a VLAN identification (VLAN-ID or VID) field, and a priority field. The C-VLAN and S-VLAN tags may have similar formats, but each defines different services and priorities for a particular packet as it is to be handled in different network domains. In that regard, one of the VIDs assigned to the packet is generally employed to identify the VLAN-ID used for internal switching operations and to segregate network traffic.

As illustrated in FIG. 1, a switch 100 may perform such functionality with respect to packets 121-124. Switch 100 generally comprises a plurality of ports 111A-B and 112A-B and a data processing engine (not illustrated) operative to forward packets in accordance with any of various algorithms or policy considerations. In the embodiment illustrated in the drawing figure, each packet 121-124 may have two VLAN tags associated with the data carried in the packet, although this need not be the case. A packet 121 ingressing switch 100 at an ingress port 111A from the customer network domain may have a customer tag (C-VLAN) as the outer tag and a service tag (S-VLAN) as the inner tag; this configuration (including the number and the order of tags) is generally referred to herein as a "tag state." Switch 100 may execute various forwarding algorithms or other processing operations to map packet 121 to egress port 112A as indicated by the dashed arrow. Egress port 112A may be a single physical port or an aggregate of several physical or logical ports, and thus may be referred to more generally as an egress interface. As set forth in more detail below, switch 100 may also modify packets 121-124 by changing tag states in accordance with various factors including, but not limited to, the nature of the network domains in conjunction with which switch 100 is intended to operate, the processing capabilities, software instructions sets, and architectural arrangement of switch 100, tags associated with packets 121-124, or a combination of these and other factors. In accordance with an embodiment, tag states may be modified as a function of the egress interface at which a packet is to be egressed and one or more of its existing VLAN tags. In that regard, in the embodiment of FIG. 1, switch 100 may modify packet 121 such that, upon egress at port 112A, the tag state has been changed to that of packet 122, i.e., S-VLAN is the outer tag, while C-VLAN is the inner tag. The VLAN tag contents (i.e., tag protocol identification (TPID), VID, priority, and canonical format indicator (CFI)) may be maintained as they were at ingress, or they may be assigned new values. It is noted that the data payload of packets 121 and 122 may be identical, though the tag states are different.

Similarly, when transmitting a packet 123 from the service provider domain to the customer domain, switch 100 may identify an ingress port 111B at which packet 123 is received, and may further identify a tag state for packet 123, in this case, S-VLAN and C-VLAN as outer and inner tags, respectively. Based in part upon such identification of ingress port 111B and the tag state, switch 100 may identify an appropriate egress port 112B to which packet 123 may be mapped (as indicated by the dashed arrow in FIG. 1). It is noted that such mapping may depend upon numerous other factors including, for instance, the state of one or more hardware registers at ingress port 111B, the MAC destination address in packet 123, the state of one or more port queues or the overall traffic load at switch 100, or a combination of these and other factors. The present disclosure is not intended to be limited to any particular forwarding algorithms or conventional technology employed at switch 100 to map an ingressing packet to an egress port.

Additionally, switch 100 may assign a VLAN identifier (such as a VID or other variable) to packet 123 associated with or related to the appropriate tag state to associate with the data payload upon egress at port 112B. In that regard, packet 124 egressing at port 112B may include the same data as packet 123, but its tag state has been modified by appropriate processing in switch 100, e.g., in accordance with the network domain to which packet 124 is transmitted.

As set forth in more detail below, certain embodiments of a system and method of modifying data packets may perform the foregoing and various other packet manipulations while requiring no dynamic software involvement. In that regard, FIG. 2 is a simplified illustration of a switch operative to manipulate the content of each VLAN tag and the egress tag state of a packet.

Switch 100 may generally comprise a plurality of ports 111 and 112. In the FIG. 2 illustration, ports 111 are ingress ports, while ports 112 are egress ports; this convention is provided for clarity of description only, and not by way of limitation. It is noted that the flow through switch 100 may be reversed, and that any particular ingress port 111 may also be employed for egress, while any particular egress port 112 may also be employed for ingress. Ports 111 and 112 depicted in FIG. 2 may represent physical ports or aggregates of physical or logical ports.

Figure 2:
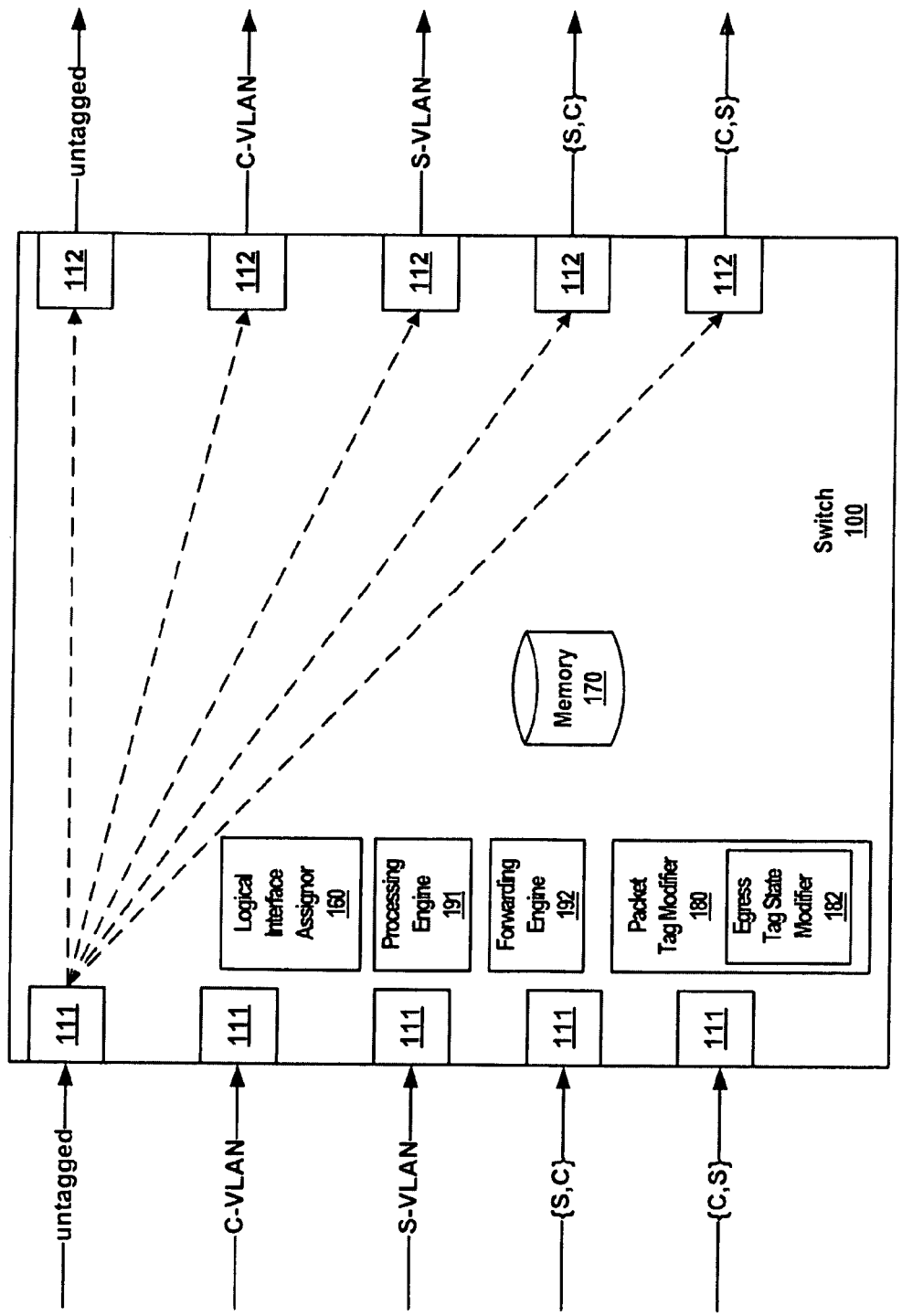
FIG. 2 is a simplified illustration of a switch operative to manipulate a tag state of a packet.

In the FIG. 2 embodiment, a packet received at an ingress port 111 may have, for example, any of the following tag states: untagged (e.g., a packet that has no VLAN tag may be considered "untagged" in this context, though such a packet may still have various other tags); tagged with a single customer tag (C-VLAN); tagged with a single service provider tag (S-VLAN); double tagged with the C-VLAN as the outer tag (S,C in FIG. 2); and double tagged with the S-VLAN as the outer tag (C,S in FIG. 2). It is noted that various additional tag states are contemplated and may have utility in practical implementations; the example illustrated in FIG. 2 using only five tag states is provided to describe the underlying principle in accordance with which numerous embodiments may operate. Those of skill in the art will appreciate on the basis of the foregoing that the types of tag states available or recognized at switch 100 may be selected in accordance with the nature, architecture, and protocols associated with the diverse networks coupled by switch 100; i.e., the nature of the network traffic handled by switch 100 may influence the number and type of tag states supported.

A packet ingressing at any of ingress ports 111 may be forwarded to egress at any one or more of egress ports 112. This is represented in FIG. 2 by the dashed arrows from the top ingress port 111 (receiving an untagged packet) to every egress port 112. In that regard, an ingressing packet may be assigned one or more VLAN tags to be used internally for bridging or forwarding decisions. Downstream in switch 100, an ingressed packet may be manipulated to have any of the tag states recognized by switch 100 upon egress. For example, an ingressing packet with only a single C-VLAN tag may be manipulated to have any of the tag states recognized by switch 100 upon egress, an ingressing packet that is untagged may be tagged in various ways upon egress, an order of tags may be changed, the content of one or more tags may be changed, and so forth. Similarly, it is noted that any of egress ports 112 may support any of the various tag states; i.e., the top egress port (illustrated as egressing an untagged packet) may actually transmit a packet having any of the tag states recognized by switch 100 in some embodiments.

Specifically, the operations of assigning an egress port 112, on the one hand, and assigning a tag state, on the other hand, may be independent of each other. These operations may depend upon, for instance, hardware register settings at ingress port 111, software or firmware implemented mapping or forwarding algorithms, a source or destination address tag associated with a packet being handled, the state of one or more queues in an egress processing pipeline, or a combination of these and other factors. In the foregoing manner, a packet received at any given ingress port 111 having a particular tag state may be forwarded to any given egress port 112 and assigned any desired tag state upon egress depending upon various factors including network protocols and operational characteristics of switch 100. In some alternative embodiments, hardware registers at an egress port may assign a tag state; i.e., once a packet is mapped to an egress port, hardware at the egress port may assign a tag state for every packet egressing at that particular port. In accordance with an embodiment, an egress tag state may be assigned as a function of an egress port or interface in combination with one or more of the VLAN-IDs assigned to the ingressed packet.

To support the foregoing functionality, switch 100 may generally comprise a logical interface assignor 160, a packet tag modifier 180, a processing engine 191, a forwarding engine 192, and a memory 170. It will be appreciated that the components illustrated in FIG. 2 may be implemented in a single, monolithic integrated circuit (IC) or an application specific IC (ASIC), for instance. Alternatively, it may be desirable in some instances that some of the components, such as memory 170, may be implemented independent (e.g., on a separate chip or ASIC) of the other components.

Processing engine 191 may be embodied in or comprise any of various types of microprocessors, microcontrollers, or other data processing components suitably configured to perform switching operations and to support the functionality set forth below. The present disclosure is not intended to be limited to any particular architecture or processing technology implemented at processing engine 191.

In operation, logical interface assignor 160 may identify an ingress port 111 at which a packet is received and assign a tag state to the packet upon ingress (i.e., an ingress tag state). One or more of the assigned tags may be used for forwarding or bridging functions. In some implementations, logical interface assignor 160 may be embodied in or comprise a tunnel termination interface (TTI) functional block operative to identify the structure of an ingressing packet based, for example, on the characteristics of packet content. In that regard, interface assignor 160 may employ or access a table of rules, e.g., using a key, to determine how to handle a particular packet. For instance, a table lookup operation may be based upon any of various factors including, but not limited to: the port 111 at which a packet ingressed switch 100; whether the packet is tagged; field values associated with the outer tag of the packet (e.g., VID and priority); and values associated with the VID and priority fields of the inner tag of the packet. Given some or all of this information to be used as an index or key, interface assignor 160, either independently or in cooperation with processing engine 191, may consult a table, database, or other data library maintained at memory 170 to identify a table entry or database record that matches, or closely approximates, the format and structure of the ingressed packet.

Such a lookup table or other library may be maintained in a ternary content addressable memory (TCAM) or other suitable memory, though memory 170 depicted in FIG. 2 is not intended to be so limited. In practical applications, memory 170 may be any type of data storage having sufficient capacity and accessibility parameters (such as read and write access times) suitable to support operations of interface assignor 160, packet tag modifier 180, and engines 191 and 192 set forth herein.

Upon identification of the type and structure of the packet as well as the ingress port 111, interface assignor 160 may apprise other components of switch 100 as to the nature and characteristics of the packet. In accordance with an embodiment, interface assignor 160 may employ one of the tags of an ingressing packet as a key as noted above. The key may be input to a VLAN table maintained, for example, in a TCAM memory. The VLAN table may include an egress interface or port list; each combination of VLAN tag and egress port has a corresponding egress tag state which may be retrieved from the VLAN table and assigned to an ingressing packet. This assignment may facilitate internal processing of packet.

In particular, interface assignor 160 may assign two VIDs (e.g., VID0 and VID1) for a packet to be egressed. The assignment of VID0 and VID1 may be representative of the logical interface (i.e., at least one of the VLAN tags and an egress port) for the packet. In some implementations, VID0 may represent the bridge domain, whereas VID1 may be the accompanying VLAN tag. During internal processing, VID0 and VID1 may be associated with a specific packet throughout switching operations, i.e., until the packet is egressed at a particular egress port 112. Assigning two such VIDs to a single packet may provide flexibility with respect to subsequent handling operations. In the foregoing manner, VID assignment may be used internally to facilitate forwarding. For example, one of the tags (typically the outer tag) may be used for forwarding or bridging decisions. A VLAN tag (as ingressed) and an egress port for a packet may be employed to assign a new tag state to the packet upon egress as set forth in more detail below.

Forwarding engine 192 may make forwarding decisions, for example, using a forwarding database (FDB) or other data structure maintained at memory 170. In that regard, an FDB may correlate several variables having utility in making forwarding decisions. In one embodiment, an FDB may comprise entries based upon VID and MAC address; for forwarding operations, a MAC destination address (DA) may be employed, whereas for learning operations, a MAC source address (SA) may be employed. Forwarding engine 192 may perform one or more lookup operations with respect to an FDB or similar data structure to determine how to handle a packet. Specifically, a packet may be forwarded as a function of the ingress port, VID0 associated with the packet, a MAC address, or a combination of these and other factors. Specifically, forwarding engine 192 determines which physical egress port 112 is to be used to egress a given packet.

In some embodiments, forwarding engine 192 uses an identifier or variable value, such as VID0, that was previously assigned (based upon the information acquired by interface assignor 160) for forwarding operations. Alternatively, VID1 may be employed in some circumstances, depending upon how these variable fields are defined and how the various data structures are configured. Specifically, those of skill in the art will appreciate that the manner in which forwarding engine 192 operates may be influenced by the contents of one or more databases or lookup tables, because the data structure may influence the assignment of VID0 and VID1; since the content of the data structure may be readily manipulated to suit the goals of a customer or network operator, the foregoing strategy provides flexibility and extensibility to switch 100.

In operation, packet tag modifier 180 may identify the previously assigned identifiers or variables (e.g., VID0 and VID1) indicating or associated with an egress port 112 from which the packet is to be egressed and a tag state for the packet upon egress (i.e., an egress tag state) and may modify the packet tags accordingly. For this purpose, and as illustrated in FIG. 2, packet tag modifier 180 may generally comprise an egress tag state modifier 182, which may use the assigned identifiers or variables to make appropriate modifications to the packet substantially as set forth below.

When a packet is to be egressed at a particular egress port 112, egress tag state modifier 182 may be employed to manipulate the packet in accordance with various parameters. In operation, tag state modifier 182 may determine the required or desired format of a given tag for egress. A VLAN tag state table or other suitable database or data structure may be maintained in memory 170 to facilitate this manipulation; in accordance with an embodiment, it may be desirable to maintain such a data structure in a TCAM. For example, such a table or database record may enable tag state modifier 182 to set the egress tag state for a particular packet based upon the physical egress port 112 (e.g., determined by forwarding engine 192 as described above) from which the packet is to be transmitted and the VID0 (or other variable) assigned to the packet. It will be appreciated that tag state modifier 182 may employ a simple lookup operation to determine the egress tag state for the packet; alternatively, tag state modifier 182 may execute additional processing operations based upon data in such a table or database to determine the egress tag state for a particular packet. As with forwarding engine 192 described above, the manner in which tag state modifier 182 operates may be influenced by the contents of one or more databases or lookup tables; since the content of the data structure may be readily manipulated to suit the goals of a customer or network operator, the egress tag state assigned to a particular packet may be managed in accordance with numerous variables in addition to, or in lieu of, VID0 and the egress port 112.

Figure 4:
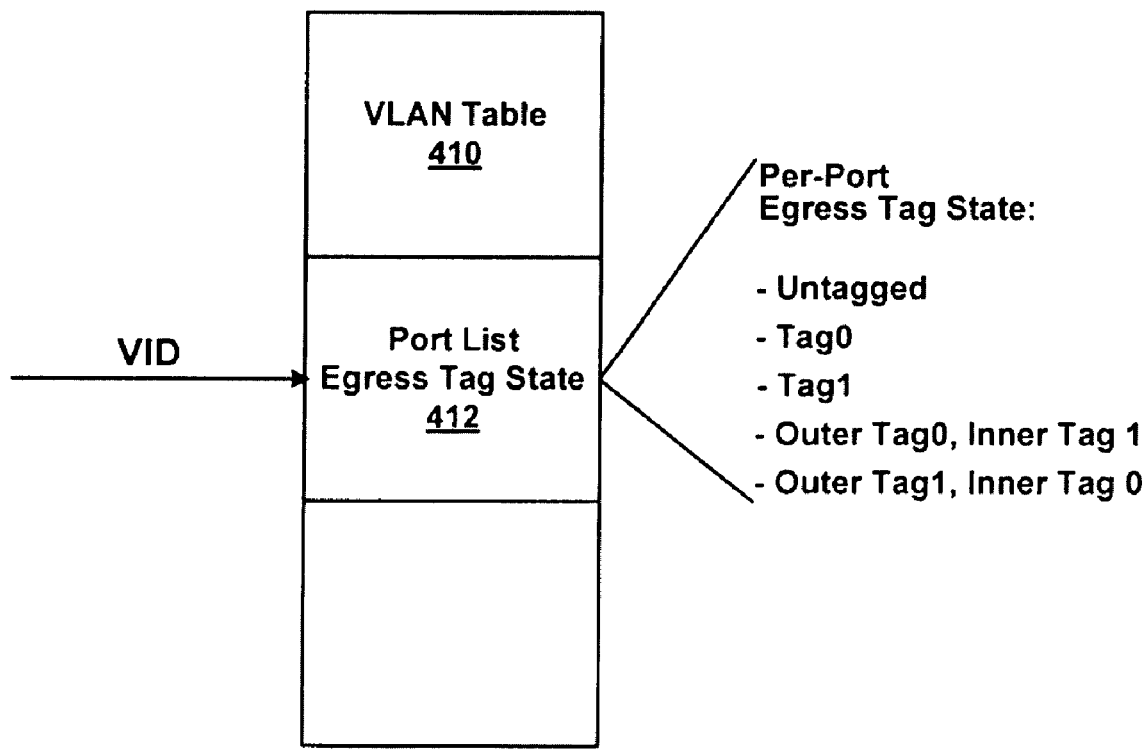
FIG. 4 is a simplified diagram illustrating one embodiment of a data structure facilitating assignment of an egress tag state.

One example of the flexibility of this strategy is illustrated in FIG. 4, which is a simplified diagram illustrating one embodiment of a data structure facilitating assignment of an egress tag state. A VLAN table 410 may be maintained in memory (such as in a TCAM, for instance). Packet tag modifier 180 may generally comprise logic (such as tag state modifier 182) to access VLAN table 410 and consult a port list 412. As noted above, either of the assigned VIDs may be employed to access VLAN table 410, depending upon the data structure maintained in port list 412 and the manner in which the VIDs are assigned (e.g., by logical interface assignor 160); in that regard, it is noted that the key used to access the VLAN table is a design choice that may be susceptible of variations depending upon numerous design considerations. As indicated in FIG. 4, VLAN table 410 may correlate various egress tag states on a per port basis in port list 412.

In operation, logic or firmware modules at tag state modifier 182 may perform a TCAM lookup or other database query (depending upon the structure of VLAN table 410) using one of the assigned identifiers as a key. Based upon the VID and the physical port associated with the egress interface at which the packet is to be egressed, one of a variety of egress tag states may be assigned. As indicated in FIG. 4, the egressed packet may be untagged, single tagged with Tag0 (such as C-VLAN), single tagged with Tag1 (such as S-VLAN), or double tagged with either of Tag0 or Tag1 as the outer tag. As set forth above, other tag alterations, either with respect to content or order, are contemplated and readily achieved with the architecture illustrated in FIGS. 2 and 4.

Upon transmission at an egress port 112, a TPID field may be set in accordance with a configuration at egress port 112, e.g., based upon hardware register settings or other mechanisms at the particular egress port 112 to which the packet is mapped. The TPID field may be employed downstream (e.g., upon ingress at a downstream switch) and serve as an indication of whether a particular packet is tagged. Accordingly, the TPID for any given packet may be readily configured in accordance with system requirements and overall operational characteristics of switch 100.

It is noted that some or all of the foregoing functionality may be integrated into a single functional block. For example, while logical interface assignor 160 and packet tag modifier 180 are represented in FIG. 2 as discrete components for clarity, their respective functionalities may be incorporated into a single logical or functional block depending, for instance, upon practical limitations such as silicon or chip real estate constraints, heat dissipation requirements, relative complexities associated with fabrication, configuration, or both, or a combination of these and other factors.

Figure 3:
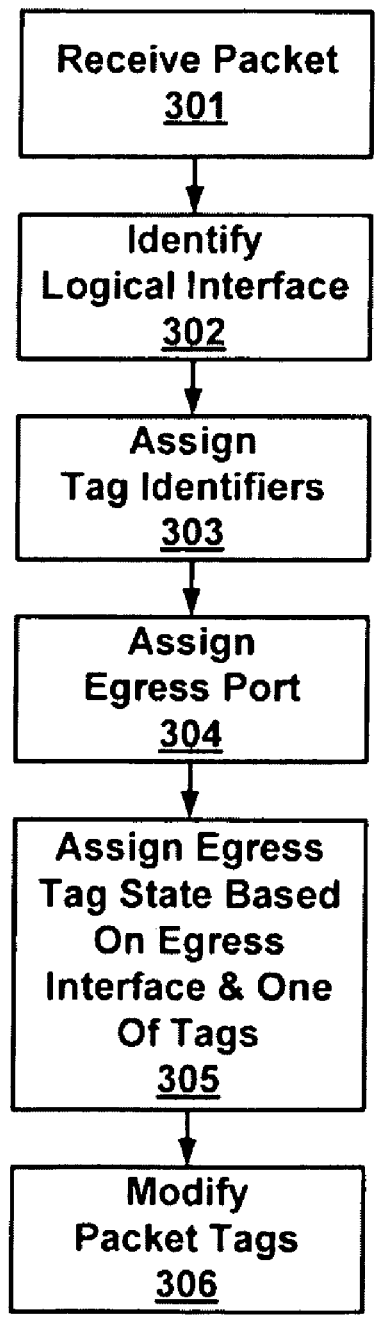
FIG. 3 is a simplified flow diagram illustrating operation of one embodiment of a method of modifying a packet for transmission in a virtual network.

FIG. 3 is a simplified flow diagram illustrating operation of one embodiment of a method of modifying a packet for transmission in a virtual network. It is noted that the operations depicted in FIG. 3 may be executed by components of a switch 100 such as illustrated in FIGS. 1 and 2 or other suitably configured network switching devices.

A method of managing a packet may begin with receiving a packet as indicated at block 301. As set forth above, a packet may be received at an ingress port (such as port 111 in FIG. 2) and processed according to various hardware register settings or other mechanisms generally known for ingressing data and control packets.

A logical interface for the ingressed packet may be identified as indicated at block 302. In some implementations, a logical interface assignor (such as depicted at reference numeral 160 in FIG. 2) may determine both the physical port (e.g., ingress port 111) at which a packet was received as well as its tag state upon ingress such that a logical egress interface may be identified. In particular, one or more aspects of the logical interface identified at block 302 may be employed to assign tag identifiers such as VIDs to the ingressed packet as indicated at block 303. In some embodiments, two VID values (e.g., VID0 and VID1) may be assigned to facilitate subsequent processing of the packet. In accordance with one implementation, VID0 may be used to identify the internal VLAN employed for processing the packet (e.g., bridge engine processing), and VID1 may be employed for egress tagging purposes. As described above with reference to FIG.

2, once the ingress port and ingress tag state are determined for a particular packet, the logical interface identification at block 302 and the assignment at block 303 may be facilitated by a VLAN table lookup operation.

As set forth in detail above, the assigning at block 303 may be executed by a logical interface assignor 160, potentially in cooperation with a hardware pipeline processor, microprocessor, or microcontroller (such as processing engine 191). A lookup table or database may be consulted, for instance, using the aspects of the ingress tag state, such as the ingress port and a VLAN tag as an index, to determine values of the identifiers (e.g., VID0 and VID1) to be assigned at block 303; in accordance with a more complex strategy, a processing engine may execute computations or forwarding algorithms, e.g., using data retrieved from such a table, to facilitate the assignment of identifiers.

The identifiers assigned at block 303 may be employed to influence internal processing executed by the processing engine to handle the packet until egress. In that regard, the method may continue with assigning an egress port from which the packet is to be egressed as indicated at block 304. This operation may be facilitated by a bridging engine (such as forwarding engine 192 in FIG. 2) or other suitably configured hardware component in cooperation with, or under control of, a processing engine. In some implementations, a MAC address and the first identifier assigned at block 303 (e.g., VID0) may be used to index a lookup table or other data structure to determine the physical port from which the packet will be egressed.

Further, an egress tag state may be assigned as indicated at block 305. As set forth above, this operation may include consulting a VLAN tag state table or other suitable database or data structure maintained in a memory, and may depend upon various factors including, but not limited to, one of the VLAN-IDs assigned to the ingressed packet, the egress port, the destination address for the packet, and the value of the first or second identifiers assigned in block 303. In one embodiment, the value of VID0 may be used to index a table or database. VID0 and VID1 may be associated with the egress tag state to the extent that either or both may be inserted as a tag VID in the packet to be transmitted. Packet tags may be modified (block 306) in accordance with the assignment at block 305.

It is noted that the assignment at block 305 may be very flexible, extensible, and readily configurable as set forth above; in that regard, the operation of assigning an egress tag state may be "arbitrary" in the sense that any one of a plurality of tag states recognized and utilized by the switch may be assigned to a tag upon egress. Further, the content of a tag (i.e., TPID, VID, priority, and CFI) may readily be changed during the assignment operation at block 305. It will be appreciated that this assignment of an arbitrary egress tag state is not limited to utilizing a predetermined tag state dictated by any particular networking protocol or network configuration.

In the foregoing manner, a processing engine may process a packet in accordance with values of certain identifiers assigned to the packet based upon a logical interface identified upon reception of the packet. Forwarding and tagging decisions may subsequently be based upon assignment of two identifiers or other variables identifying two VLAN tags. In one embodiment, VID0 is used as a component in the bridge engine processing and as a component of the index into an egress tag state table. Depending upon the resulting egress tag state, the assigned VID0 and VID1 may be used as a C-VLAN tag, an S-VLAN tag, or both for an egressing packet. The flexibility of the packet modification system and method described herein is limited only by the sophistication of the data structures employed to correlate identifiers with egress port and egress tag state combinations.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A network switch, comprising
an ingress port to receive a packet of data from a source address in a first network domain that is to be transmitted to a destination address in a second network domain;
a logical interface assignor to assign, in the network switch, at least two virtual local area network (VLAN) tag identifiers to the packet;
a forwarding engine to forward the packet to an assigned egress interface in accordance with information associated with one of the at least two VLAN tag identifiers that are assigned in the network switch;
a packet tag modifier, responsive to a configuration of the egress interface and to one of the at least two VLAN tag identifiers that are assigned in the network switch, to assign an egress tag state to the packet prior to egress at the egress interface; and
a physical egress port associated with the egress interface to egress the packet to the destination address.

2. The network switch of claim 1 wherein the first network domain is a customer network and the second network domain is a service provider network.

3. The network switch of claim 1 wherein the first network domain is a subnetwork and the second network domain is a enterprise network.

4. The network switch of claim 1 wherein said packet tag modifier modifies a tag associated with the packet in accordance with the egress tag state.

5. The network switch of claim 4 wherein said packet tag modifier modifies a value of the tag.

6. The network switch of claim 5 wherein said packet tag modifier modifies content of the tag.

7. The network switch of claim 4 wherein said packet tag modifier removes the tag from the packet.

8. The network switch of claim 4 wherein said packet tag modifier changes an order of at least two tags in the packet.

9. The network switch of claim 4 wherein said packet tag modifier assigns the egress tag state according to an egress tag state table.

10. The network switch of claim 1 wherein the egress tag state is assigned from the group consisting of: untagged; single tagged with a customer virtual local area network (C-VLAN) tag; single tagged with a service provider virtual local area network (S-VLAN) tag; double tagged with a C-VLAN tag first and an S-VLAN tag second; and double tagged with an S-VLAN tag first and a C-VLAN tag second.

11. The network switch of claim 1 wherein each of the at least two VLAN tag identifiers is a VLAN identification (VID) that identifies a VLAN associated with the packet.

12. The network switch of claim 1 further comprising a memory maintaining a egress tag state table and wherein said packet tag modifier comprises logic to access the egress tag state table to assign the egress tag state to the packet.

13. The network switch of claim 12 wherein said packet tag modifier accesses the egress tag state table using a key.

14. The network switch of claim 13 wherein the key is one of the at least two VLAN tag identifiers.

15. The network switch of claim 12 wherein said packet tag modifier accesses the egress tag state table to assign the egress tag state in accordance with said physical egress port.

16. The network switch of claim 12 wherein said memory is a ternary content addressable memory (TCAM).

17. A method of modifying a packet in a virtual local area network (VLAN); said method comprising:
   receiving a packet of data from a source address in a first network domain that is to be transmitted to a destination address in a second network domain;
   identifying an ingress port at which the packet is received and an ingress tag state of the packet upon ingress;
   responsive to said identifying, assigning, after the packet is received at the ingress port, at least two virtual local area network (VLAN) tag identifiers to the packet;
   forwarding the packet to an assigned egress interface in accordance with information associated with one of the at least two VLAN tag identifiers that are assigned after the packet is received at the ingress port;
   responsive to a configuration of the egress interface and to one of the at least two VLAN tag identifiers that are assigned after the packet is received at the ingress port, modifying an egress tag state of the packet prior to egress at the egress interface; and
   egressing the packet to the destination address at a physical egress port associated with the egress interface.

18. The method of claim 17 wherein the first network domain is a customer network and the second network domain is a service provider network.

19. The method of claim 17 wherein the first network domain is a subnetwork and the second network domain is a enterprise network.

20. The method of claim 17 wherein said modifying comprises changing a value of the tag.

21. The method of claim 20 wherein said modifying comprises changing content of the tag.

22. The method of claim 17 wherein said modifying comprises removing the tag from the packet.

23. The method of claim 17 wherein said modifying comprises changing an order of at least two tags in the packet.

24. The method of claim 17 wherein said modifying comprises selecting the egress tag state according to an egress tag state table.

25. The method of claim 24 wherein said modifying further comprises accessing the egress tag state table using a key.

26. The method of claim 25 wherein the key is one of the at least two VLAN tag identifiers.

27. The method of claim 25 wherein said modifying comprises modifying the egress tag state in accordance with the physical egress port.

28. The method of claim 24 wherein the egress tag state table is maintained in a ternary content addressable memory (TCAM).

29. The method of claim 17 wherein said forwarding comprises mapping the packet to the egress interface according to a record in a database.

30. The method of claim 17 wherein the egress tag state is selected from the group consisting of: untagged; single tagged with a customer virtual local area network (C-VLAN) tag; single tagged with a service provider virtual local area network (S-VLAN) tag; double tagged with a C-VLAN tag first and an S-VLAN tag second; and double tagged with an S-VLAN tag first and a C-VLAN tag second.

31. The method of claim 17 wherein each of the at least two VLAN tag identifiers is a VLAN identification (VID) that identifies a VLAN associated with the packet.

32. An Ethernet switch configured and operative to perform the method of claim 17.

* * * * *